United States Patent
Temmerman et al.

(10) Patent No.: US 7,284,766 B2
(45) Date of Patent: Oct. 23, 2007

(54) AIR SUSPENSION SYSTEM FOR MOTORCYCLES AND BICYCLES

(76) Inventors: Dirk Temmerman, 721 B N. Shirk Rd., Visalia, CA (US) 93291; Fred William Gill, 22386 Myer Dr., Exeter, CA (US) 93221

( * ) Notice: Subject to any disclaimer, the term of this patent is extended or adjusted under 35 U.S.C. 154(b) by 211 days.

(21) Appl. No.: 11/082,606

(22) Filed: Mar. 16, 2005

(65) Prior Publication Data

US 2005/0206117 A1    Sep. 22, 2005

Related U.S. Application Data

(60) Provisional application No. 60/554,141, filed on Mar. 17, 2004.

(51) Int. Cl.
   *B62K 19/00*    (2006.01)
(52) U.S. Cl. .............. 280/275; 280/279; 280/283
(58) Field of Classification Search ............ 280/275, 280/279, 283; 74/551.1–551.4
   See application file for complete search history.

(56) References Cited

U.S. PATENT DOCUMENTS

| | | | |
|---|---|---|---|
| 4,275,900 A | | 6/1981 | Andreoli et al. |
| 4,732,244 A | | 3/1988 | Verkulen |
| 4,830,395 A | | 5/1989 | Foley |
| 5,044,648 A | * | 9/1991 | Knapp ............ 280/283 |
| 5,186,074 A | * | 2/1993 | Arnold ............ 74/551.2 |
| 5,209,319 A | | 5/1993 | Buell |
| 6,311,961 B1 | | 11/2001 | Julia |
| 6,390,256 B1 | | 5/2002 | Fruehauf et al. |
| 6,520,524 B1 | | 2/2003 | Costa |
| 6,533,305 B1 | | 3/2003 | Falk |
| 6,611,743 B2 | | 8/2003 | Sakai |

OTHER PUBLICATIONS

"Tech-Care Motorcycle Suspension", http://www.tech-care.com, Mar. 10, 2004, 3 pages, Tech-Care Suspension, Internet, US.
"Springs", http://www.moto-pro.com/springs.shtml, Mar. 10, 2004, 5 pages, Moto Pro Suspension, Internet, US.
"New Products!", http://www.tech-care.com/new_products.htm, Mar. 10, 2004, 4 pages, Tech-Care Suspension, Internet, US.
"Too Tech Racing", http://www.tootechracing.com, Mar. 10, 2004, 14 pages, Too Tech Suspension, Internet, US.
"Kayaba Air Tanks", http://www.tootechracing.com/Hayaba%20Air%20Tanks.htm, Mar. 10, 2004, 4 pages, Too Tech Suspension, Internet, US.

* cited by examiner

*Primary Examiner*—Lesley D. Morris
*Assistant Examiner*—Marlon Arce-Diaz
(74) *Attorney, Agent, or Firm*—Richard A. Ryan

(57) ABSTRACT

An air suspension system for use with vehicles such as motorcycles and bicycles comprises a sealed chamber inside the handlebars and a fluid line that interconnects the chamber with the vehicle's pneumatic shock absorber, typically part of the forks. Preferably, the system includes a control valve in fluid communication with the chamber and disposed at or between the handlebars or at the forks. In the preferred embodiment, the control valve is connected to a port located near the center of the handlebars. The preferred embodiment also includes a manual pressure release valve in communication with the chamber and an oil/air separator and/or check valve configured to generally prevent oil from entering the chamber. The pressure release valve and/or the separator or check valve can be made integral with or separate from the control valve. Handlebar caps or plugs can be used to seal the handlebars.

20 Claims, 4 Drawing Sheets

AIR SUSPENSION SYSTEM FOR MOTORCYCLES AND BICYCLES

CROSS-REFERENCE TO RELATED APPLICATIONS

This application claims the benefit of U.S. Provisional Application No. 60/554,141 filed Mar. 17, 2004.

BACKGROUND OF THE INVENTION

A. Field of the Invention

The field of the present invention relates generally to air suspension systems for motorcycles and bicycles. More particularly, the present invention relates to vehicle air suspension systems that utilize one or more pneumatic shock absorbers hydraulically connected to a source of air on the motorcycle or bicycle to provide improved shock absorbing effect. Even more particularly, the present invention relates to such air suspension systems that utilize an integrated tubular component as the source of air.

B. Background

Motorcycles and bicycles are generally configured with a front fork that interconnects the handle bar of the motorcycle or bicycle with the front wheel. Most motorcycles and many bicycles, particularly those utilized for off-road racing and cross-country sporting competitions, comprise a front suspension system that is intended to improve the stability, rideability and steering properties of the motorcycle or bicycle, particularly on the generally rough track or path utilized for motorcycle or bicycle racing. The typical front suspension system comprises a pair of independent shock absorber devices, each having a shock-damper assembly, that cooperate with or are incorporated into (most common) the front forks of the motorcycle or bicycle. In the past, front suspension systems for motorcycles and bicycles basically comprised just the shock absorbers, which were generally configured with a piston component that divided the shock absorber cylinder or fork into two chambers, an upper chamber and a lower chamber, in which the piston reciprocated to compress a fluid, such as oil. A piston rod interconnects one end of the piston with either the wheel assembly or a portion of the frame of the motorcycle or bicycle. A spring is generally utilized with the shock absorber to provide additional damping. A trunnion connects the other end of the shock absorber to either the wheel assembly or a portion of the frame of the motorcycle/bicycle. As the piston reacts to the impact force imparted on the wheel from the road, track or path, fluid from the upper chamber flows to the lower chamber and the spring compresses to dampen the impact.

As known to those skilled in the art, more modern suspension systems utilize the front forks as part of the suspension system. Air contained in the front fork acts as an additional spring that, when compressed, further resists the impact force on the front wheel. In general, the more air volume that is available in the shock absorber the softer the ride will be and the less air volume in the shock absorber the more resistant the system will be to "bottoming out" the forks. The resistance in the small air volume systems increases rapidly, thereby making the suspension harsh on the initial portion of the stroke (i.e., small bumps). Because the amount of air in the system affects the ride (handling versus smoothness of the ride), the front forks are typically provided with two air tight caps on the closed upper end of the fork that have an air-release bleed screw in the caps to allow the user to bleed air from the shock absorber to release the build-up of air pressure therein. Unfortunately, it is generally impossible to utilize the air-release bleed screws to adjust the suspension system while the motorcycle is being utilized.

To improve on the stability, rideability and overall handling of the motorcycle or bicycle, many riders utilize an additional air storage system that is outfitted with controls that allows them to better adjust the ride and handling of the motorcycle/bicycle. A variety of such systems are available for use. The typical air tank system comprises an air tank or air bottle mounted on the motorcycle/bicycle that is connected to the fork's air port via a hose, which is generally a stainless steel hose. Most such systems also include a bleed screw or other adjusting valve having an adjustable orifice that controls airflow in both directions to allow the rider to adjust the amount of air that transfers between the front forks and the air tank. Typically, any such air tank or tanks are attached directly to the front forks, adjacent to or near the motorcycle's engine, on the frame or above the front forks on the handlebar assembly (i.e., behind the front number plate). Examples of air tank suspension systems currently available include those from Too Tech Racing, Tech-Care and Moto Pro Suspension. Various United States patents also describe pneumatic suspension systems for motorcycles and bicycles, including U.S. Pat. No. 4,275,900 to Andreoli, U.S. Pat. No. 4,732,244 to Verkuylen, U.S. Pat. No. 5,209,319 to Buell, U.S. Pat. No. 6,311,961 to Julia, U.S. Pat. No. 6,520,524 to Costa, U.S. Pat. No. 6,533,305 to Falk and U.S. Pat. No. 6,611,743 to Sakai, the disclosures of which are incorporated herein by reference.

The presently available air tank suspension systems have a number of limitations. One of the primary limitations is the additional weight of the air tank that must be carried on the motorcycle/bicycle. As is well known, many motorcycle and bicycle riders, particularly competitive riders, are willing to spend money to purchase components for their motorcycle or bicycle that are made out of lighter weight materials, such as titanium and carbon fiber, so as to reduce the vehicle's weight. Unfortunately, in order to obtain the benefits of the presently available air tank suspension systems, the rider is required to add weight to his or her motorcycle or bicycle. From a rider's standpoint, particularly those serious about performance, the additional weight is not insignificant. Another limitation of the presently available air tank suspension systems is the placement of the air tank on the motorcycle or bicycle. If the air tank is not securely mounted on the motorcycle or bicycle, it can shake loose and fall off, which can damage the tank or even the motorcycle or bicycle itself, particularly those systems that utilize tanks that attach to the front fork or at the handlebar assembly. Another limitation of presently available air tank suspension systems is the fact that most such systems do not allow the rider to easily adjust the air flow while he or she is riding, which is often when it is most needed. The typical air suspension system uses an automotive-type valve stem that requires the use of manual tools to release air.

What is needed is an air suspension system for vehicles such as motorcycles and bicycles that solves the problems and provides the benefits described above. The preferred air suspension system should be configured to provide the benefits of additional air storage for the front fork suspension system of the motorcycle or bicycle without the additional weight issues associated with presently available air suspension systems. The preferred air suspension system should allow the rider to easily and safely adjust the amount of air flow to and from the front fork to adjust the damping effect thereof while he or she is riding the motorcycle or bicycle. The preferred air suspension system should also be both economical to manufacture and use and be adaptable for retrofit to many existing suspension systems.

SUMMARY OF THE INVENTION

The air suspension system for motorcycles and bicycles of the present invention provides the benefits and solves the problems identified above. That is to say, the present invention discloses an air suspension system that is effective at providing the desired suspension characteristics with substantially less weight than the presently available air suspension systems. The air suspension system of the present invention utilizes a sealed chamber in the handlebars of the motorcycle or bicycle as the storage tank for the suspension system, thereby eliminating the need for a separate air tank. The present invention is adaptable to new motorcycle and bicycle suspension systems and to retrofitting existing suspension systems without undo modification to the motorcycle or bicycle. The present air suspension system allows the rider to easily and safely adjust the air flow from and to the front fork while he or she is riding the motorcycle/bicycle and it is economical to manufacture and use.

In one general aspect of the present invention, the air suspension system for motorcycles and bicycles of the present invention basically comprises a sealed chamber disposed in the vehicle's handlebars and a fluid line that interconnects the chamber and the vehicle's pneumatic shock absorber(s). In the preferred embodiment, the air suspension system also includes a control valve that is in fluid communication with the chamber and disposed between the chamber and the pneumatic shock absorber, either at the handlebars, at the pneumatic shock absorber or therebetween. The fluid line is appropriately configured to allow air and other fluids to flow between chamber and the pneumatic shock absorber through the control valve. In the preferred embodiment, the handlebars includes a control valve port that is in fluid communication with the chamber and the control valve is connected to the control valve port and mounted on the handlebars in easy reach of the rider so that he or she may adjust the control valve while riding. The preferred embodiment also includes a pressure release valve in fluid communication with the chamber and configured to selectively release air from the chamber. In one configuration, the pressure release valve is connected to a bleeder valve port disposed in the handlebars and in communication with the chamber. In another configuration, the pressure release valve is integral with the control valve. The preferred embodiment also includes an oil/air separator and/or a check valve disposed between the pneumatic shock absorber and the chamber that are configured to substantially prevent oil from entering the chamber. The separator can be made integral with the control valve or be disposed in the fluid line between the control valve and the pneumatic shock absorber. In a preferred embodiment, a one-way check valve mounts to a port on the fork and is disposed between the fork and the end of the fluid line. The sealed chamber inside the handlebars can be obtained through the use of handlebar caps or internal plugs at the ends of the handlebars or by providing a walled enclosure inside the handlebars.

Accordingly, the primary objective of the present invention is to provide an air suspension system for motorcycles and bicycles that provides the advantages discussed above and that overcomes the disadvantages and limitations associated with presently available air suspension systems.

It is also an important objective of the present invention to provide an air suspension system for motorcycles and bicycles that utilizes a sealed chamber inside the handlebars of the motorcycle or bicycle as the air storage tank for the air suspension system.

It is also an important objective of the present invention to provide an air suspension system for motorcycles and bicycles that has a control valve attached to a control valve port on the vehicle's handlebars that connects to the pneumatic shock absorbers via a fluid line so that air may be selectively stored in a sealed chamber inside the vehicle's handlebars.

It is also an important objective of the present invention to provide an effective and low-weight air suspension system that is adaptable to new and existing motorcycle and bicycle suspension systems.

It is also an important objective of the present invention to provide an air suspension system that allows the rider to easily adjust the flow of air between the forks of the motorcycle and the handlebars comprising the air storage tank while riding the motorcycle or bicycle.

It is also an important objective of the present invention to provide an air suspension system that utilizes the handlebars as an air storage tank and which has an oil/air separator and/or a check valve to prevent oil from the forks being forced into the handlebars.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, and particularly with reference to the embodiments of the air suspension system for motorcycles and bicycles of the present invention illustrated in the figures, various preferred embodiments of the present invention are set forth below. The enclosed description and drawings are merely illustrative of preferred embodiments and represent several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein. For purposes of this disclosure, references are generally to use of the present invention with motorcycles, however, it is understood that the disclosure herein applies to bicycles and other like configured vehicles.

Figure 1:
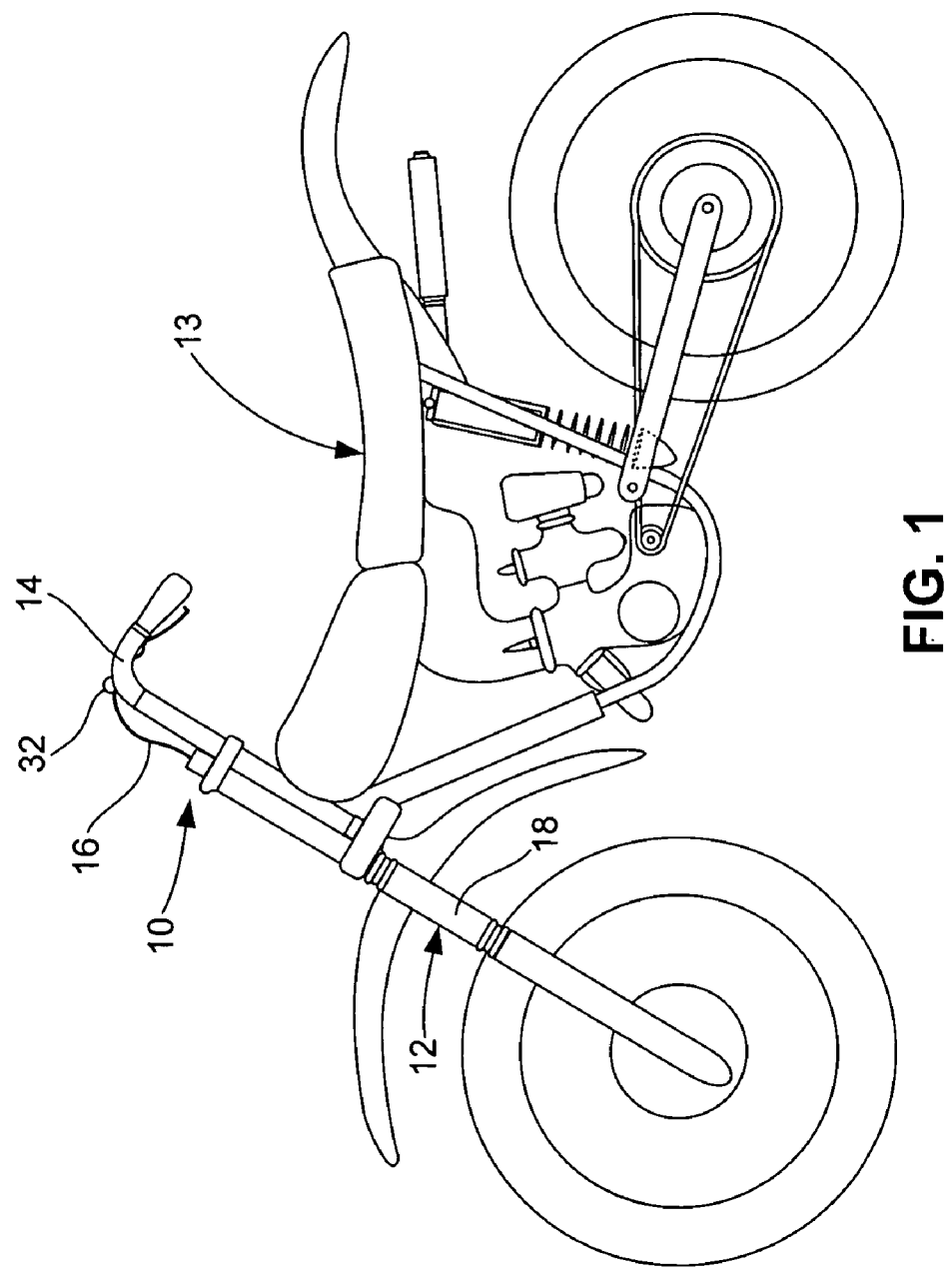
FIG. 1 is a side view of a motorcycle having an air suspension system configured according to a preferred embodiment of the present invention.

An air suspension system for motorcycles and bicycles that is manufactured out of the components and configured pursuant to the concepts and principles of the present invention is shown generally as 10 in the figures. As shown in FIG. 1, air suspension system 10 generally comprises the pneumatic shock absorber component 12 of the motorcycle 13, the motorcycle's handlebars 14 and a fluid line or hose 16 interconnecting pneumatic shock absorber component 12 and handlebars 14. In the embodiment shown generally in the figures, shock absorber component 12 is incorporated in the front forks 18 of motorcycle 13 and the hollow interior of handlebars 14 is utilized as the air tank for air suspension system 10. Utilizing handlebars 14 as the air tank increases the total air volume for the motorcycle's air suspension system while equalizing the pressure between the two forks 18 without the weight, bulk, complexity and mounting problems associated with existing air suspension systems. As explained in more detail below, use of handlebars 14 as the air tank also facilitates improved access to metering and control of the flow of air between handlebars 14 and forks 18.

Figure 2:
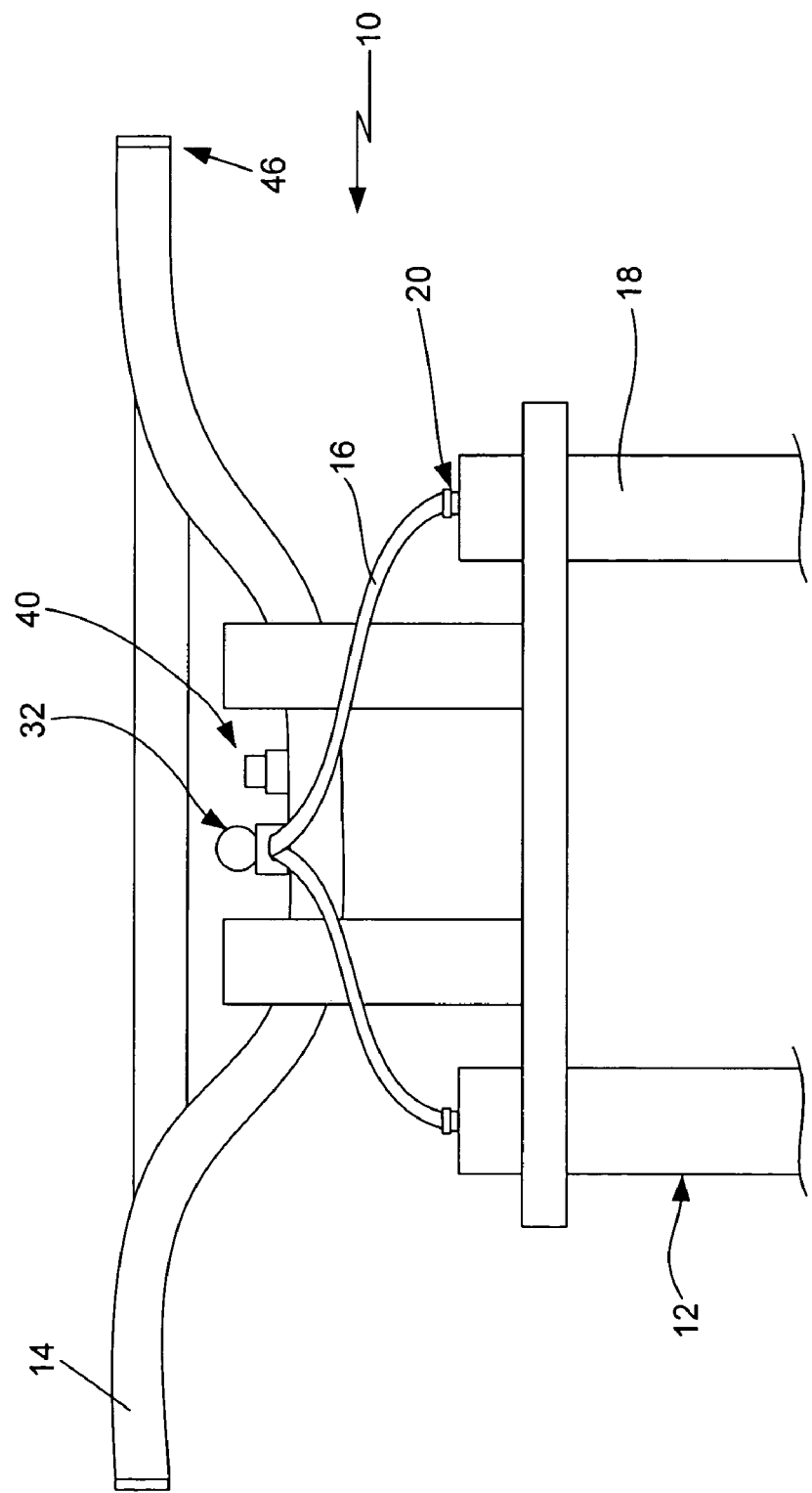
FIG. 2 is a front view of an air suspension system configured according to a preferred embodiment of the present invention shown mounted on the front of a motorcycle.
Figure 3:
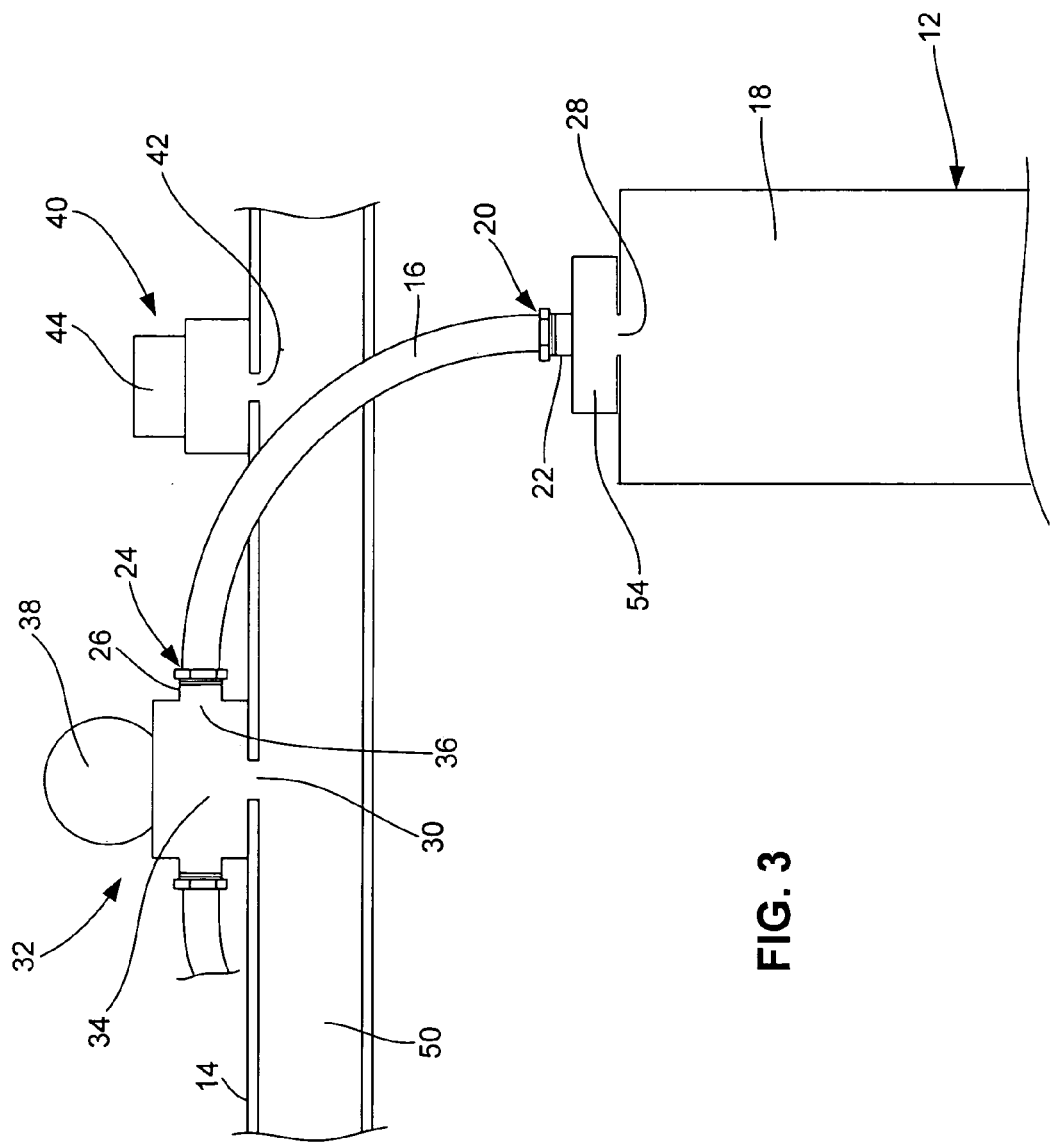
FIG. 3 is an isolated front view of an alternative air hose connection to the front fork and handlebar of a motorcycle and the use of a check valve at the front fork.

In a preferred embodiment, shown in FIGS. 2 and 3, fluid line 16 has a first fitting 20 with threaded end 22 at one end and a second fitting 24 with a threaded end 26 at the opposite end thereof. The end of fluid line 16 with first fitting 20 is configured to threadably engage the generally preexisting threaded fluid port 28 of forks 18, presently used for a bleed screw, on the upper portion of forks 18 (fluid port 28 is shown in the figures as being positioned on top side of forks 18, although it may be located elsewhere on forks 18). In some motorcycle or bicycle front end configurations, an adapter fitting, such as a dual threaded end brass adapter, may be necessary to connect first fitting 20 with the bleed screw fluid port 28 on top of forks 18. Although fluid lines 16 can be any type of conduit, whether rigid or flexible, that is suitable for transmitting air between the chamber inside forks 18 and handlebars 14, a preferred fluid line 16 is the braided, stainless steel air pressure lines commonly used on air suspension systems (such as the presently available Too Tech Racing, Tech-Care and Moto Pro Suspension systems) and other pneumatic systems. A suitable handlebar control valve port 30 is added to the configuration of standard handlebars 14 so that an adjustable metering or control valve 32 can be engaged therewith and connected to or mounted on handlebars 14. As known in the art, although a variety of materials may be suitable for handlebars 14 for use with the present invention, handlebars 14 are typically made out of aluminum, steel or titanium.

In a preferred embodiment of the air compression system 10 of the present invention, a two-way, adjustable flow control valve 32 is disposed between handlebars 14 and forks 18. Control valve 32 can be located at handlebars 14, at one of forks 18 or disposed between handlebars 14 and forks 18. One or more fluid lines 16 is configured to interconnect control valve 32 to handlebars 14 and/or forks 18 as necessary to allow fluid (i.e., air) to flow between handlebars 14 and forks 18. In a preferred embodiment, control valve 32 is located at or about the center of handlebars 14 so that it will be easily accessible to the rider when he or she is riding motorcycle 13 so that it may be adjusted as necessary or desired to affect the ride and/or control of motorcycle 13. As known to those skilled in the art, the preferred control valve 32 is one that has an adjustable orifice to control the rate of air going into handlebars 14 and check valve to allow nearly free flow of the air out of handlebars 14 to pneumatic shock absorbers 12 so that the forks will rebound quickly instead of packing or feeling dead. As best shown in FIG. 3, control valve comprises a valve body 34 having one or more valve ports 36 configured to attach to threaded end 26 of second fitting 24 and a valve control mechanism 38 that allows the user to selectively control the amount and/or rate of air that will flow into handlebars 14. Valve control mechanism 38 can of the type that meters the air flow that transfers to and from handlebars 14 and which allows the user to "dial in" a suspension level that is suitable for any type of riding. As known in the art, at low fork compression speed (i.e., small bumps), the handlebars 14 add extra air volume, making the forks 18 feel plusher and at high compression speeds (i.e., big bumps), control valve 32 restricts the air flow between the forks 18 and handlebars 14 to prevent bottoming out. As will be readily apparent to those skilled in the art, control valve 32 may be located elsewhere on handlebars 14 and still accomplish the objectives of the present invention. Second fitting 24 of each fluid line 16 is sized and configured to connect to control valve 32 so as to hydraulically interconnect pneumatic shock absorbers 12 of forks 18 with handlebars 14. Control valve 32 can be configured with a single hose connection that branches off to individual fluid lines 16 for each fork 18, as shown in FIG. 2, or it can be configured with a pair of hose connections, one for each fluid line 16, as shown in FIG. 3. As known in the art, appropriate sealing mechanisms, such as O-rings and the like, may be necessary to ensure an air-tight connections for first hose fitting 20 and second hose fitting 24. In an alternative embodiment, control valve 32 and the one or more fluid lines 16 can be an integral unit, thereby eliminating the need for second fitting 24 and any sealing mechanisms.

Figure 5:
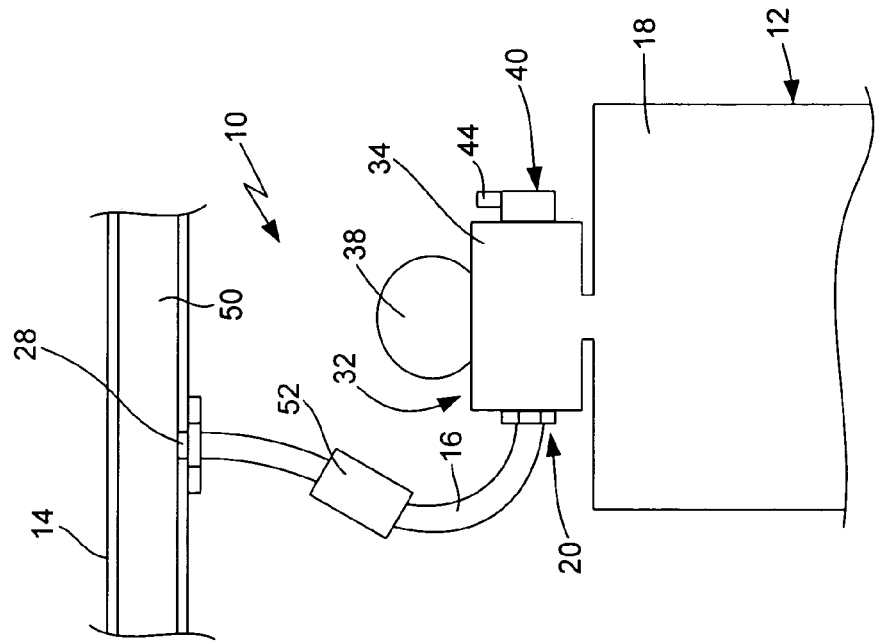
FIG. 5 is an isolated front view of an air suspension system configured according to an alternative embodiment of the present invention.
Figure 4:
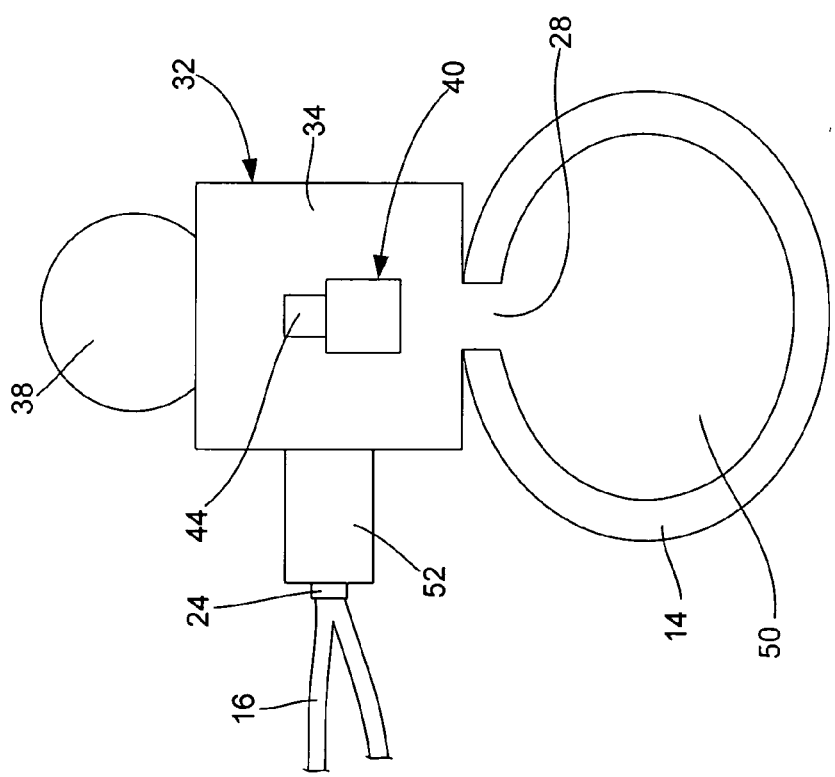
FIG. 4 is an isolated side view of a control valve component of the air suspension system of the present invention shown mounted on the handlebars of a motorcycle.

In addition to metering/control valve 32, it is also preferred to provide a one-way pressure release or bleeder valve 40 to allow the rider to selectively release air from air suspension system 10. FIGS. 2 and 3 show an embodiment of the present invention where pressure release valve 40 is a separate valve and FIGS. 4 and 5 show an embodiment of the present invention where pressure release valve 40 is attached to or part of valve body 34 of control valve 32. For the pressure release valve 40 configurations shown in FIGS. 2 and 3, it will generally be necessary to provide (i.e., by drilling) an appropriately sized and configured bleeder valve port 42 in handlebars 14 for installation of pressure release valve 40. In this configuration, bleeder valve port 42 will be in addition to the hole for control valve port 30. Because the combination control valve 32 and pressure release valve 40 shown in FIGS. 4 and 5 requires only one port (i.e., control valve port 30) in handlebars 14, that configuration is generally preferred. As known to those skilled in the art, holes drilled in handlebars 14 require more effort, results in simpler installation and reduces the likelihood of stress fractures for handlebars 14. In either configuration, the preferred pressure release valve 40 will be of the type that is manually operated and easy to access for a rider while he or she is riding motorcycle 13 so that air can be released while riding. One configuration for pressure release valve 40 is the type that has a spring-loaded push button operation such that pushing button 44 down will release air from air suspension system 10. In an alternative configuration, both metering/control valve 32 and pressure release valve 40 can be configured to attach to one bracket or separate brackets, such as an aluminum bracket, that is configured in a generally half-tubular shape, suitable for attachment to handlebars 14 with adhesive, screws, bolts or other commonly available connecting mechanisms.

It will be clear to those skilled in the art that handlebars 14 need to be configured to be virtually airtight. Although the primary portion of existing handlebars 14 are airtight, the ends 46 of handlebars 14 are often at least partially open to the atmosphere. As such, it may be necessary to provide a pair of handlebar caps or internal plugs 48 suitable for sealing the interior chamber, shown as 50 on FIG. 3, inside handlebars 14 to ensure the system is airtight. As set forth above, it will generally be necessary, for those handlebars 14 having open ends 46, to provide appropriate sealing mechanisms, such as O-rings and the like, to seal the connections for end cap/plug 48. Use of handlebar caps/plugs 48 allows retrofit of existing motorcycles 13 to facilitate use of air suspension system 10 of the present invention therewith to obtain an airtight chamber 50. To use system 10 with an existing motorcycle 13, the user only needs to add the necessary port or ports and handlebar caps/plugs 48. For new motorcycles 13 that incorporate the present system, the handlebars can be manufactured with sealed ends 46 and with the necessary ports (i.e., control valve port 30 and bleeder valve port 42) to connect metering/control valve 32 and pressure release valve 40 (and therefore fluid lines 16). As will be understood by those skilled in the art, handlebars 14 can be configured such that chamber 50 is less than the entire interior volume of handlebars 14 by providing one or more interior plates (not shown) inside handlebars 14 that are configured to provide sealed chamber 50. In such a configuration, the ends 46 of handlebars 14 can be open or only partially sealed.

As known to those skilled in the art, loading on forks 18 can inadvertently push hydraulic oil up into the air tanks or chamber 50 in handlebars 14 of the present invention. Although this effect may be a minimal problem for the amateur or casual rider, the hard riding typically associated with professional riders and the like can result in a non-insignificant amount of hydraulic oil inside of chamber 50. To avoid this problem, the preferred embodiment of the present invention includes an oil/air separator or filter apparatus 52 (as shown in FIGS. 4 and 5) and/or a one-way check valve 54 (as shown in FIG. 3) disposed between forks 18 and chamber 50 in handlebars 14. Separator 52 is configured with a separator chamber or other mechanism therein for separating the oil from the air stream to prevent oil from reaching chamber 50. Check valve 54 is configured such that as the pressure raises in forks 18 the check valve 54 will close to prevent oil from reaching chamber 50. As shown in the embodiment of FIGS. 4 and 5, the preferred location for separator 52 is between forks 18 and control valve 32. Alternatively, separator 52 can be located between control valve 32 and chamber 50. As shown in FIG. 4, separator 52 can be incorporated into or attached to control valve 32 such that it is a single unit. Various types of separators 52 are known and adequate for use with the air suspension system 10 of the present invention. As shown in FIG. 3, a preferred placement of check valve 54 is between fluid port 28 in fork 18 and first fitting 20 at the end of fluid line 16. As will be readily apparent to those skilled in the art, check valve 54 can be placed elsewhere in system 10 and can be used separately or in conjunction with separator 52 (including being integral therewith).

To install a preferred embodiment of air suspension system 10 to an existing motorcycle, the user would drill a hole in handlebars 14 for control valve port 30 to connect the two-way metering/control valve 32. Preferably, but not necessary, the hole would be drilled at or near the center of handlebars 14 to provide the rider with better access to valve control mechanism 38 and bleeder button 44. Metering valve 32, preferably comprising pressure release valve 40 and oil/air separator 52 and/or check valve 54, is either screwed directly into control valve port 30 on handlebar 18 or into a fixed orifice tapped into control valve port 30. Handlebar caps/plugs 48 are applied to the ends 46 of handlebar 14 to seal off handlebars 14 and provide an airtight chamber 50 therein. If necessary (i.e., for a separate pressure release valve 40), a second hole is drilled into handlebars 14 to provide a bleeder valve port 42 for pressure relief valve 40. For convenience and accessibility for the rider, though not necessary or required, bleeder valve port 42 is positioned generally adjacent to or near control valve port 30 for metering/control valve 32. A one-way pressure release valve 40 is tapped into bleeder valve port 42. Fluid lines 16 are attached to control valve 32 and to the fork caps on both forks 18. In use, air will flow between forks 18 and sealed chamber 50 inside handlebars 14, which will perform the function of the separate air tanks of presently available air suspension systems. Preferably, control valve 32 is configured such that the rider can dial or rotate the adjustable valve control mechanism 38 on control valve 32 to vary the amount of air flow between forks 18 and chamber 50 and push down on or otherwise operate the pressure release button 44 on pressure release valve 40 to allow air to be released from air suspension system 10 while riding the motorcycle 13. Control valve 32 can be configured to allow the rider to select his or her own custom settings and/or it can be configured with a number of pre-selected settings that the rider can click on to set. Allowing additional air to flow from the forks 18 to air chamber 36 will provide a plusher ride and, in reverse, prevent bottoming out. As such, air suspension system 10 provides the known benefits of other air suspension systems without the weight and bulk associated with having a separate air tank or tanks.

As will be recognized by those skilled in the art, utilizing chamber 50 inside handlebars 14 as the air tank reduces weight, bulk, potential problems known to exist with attached tanks falling off and facilitates placement of the meters and control mechanisms closer to the rider where he or she can operate the mechanism, without the use of tools, while riding motorcycle 13. The present air suspension system 10 allows the rider to quickly dial in the desired suspension for any type of riding, whether racing, off-road or street, by adjusting metering/control valve 32. Control valve 32 regulates the amount of air that can transfer from forks 18 to chamber 50 inside of handlebars 14. At low fork compression speed (i.e., small bumps), chamber 50 adds extra air volume, making forks 18 feel plusher. At high compression speeds (i.e., big jumps), metering/control valve 32 restricts the air flow between forks 18 and chamber 50 inside of handlebars 14 to prevent bottom out. As will be readily appreciated by those skilled in the art, air suspension system 10 of the present invention is adaptable to a variety of diameter handlebars 14, whether single wall, double wall, tapered or non-tapered. As known in the art, handlebars 14 and the components of air suspension system 10 can be made of aluminum, steel, titanium or other suitable materials.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use. For instance, there are numerous components described herein that can be replaced with equivalent functioning components to accomplish the objectives of the present invention.

What is claimed is:

1. An air suspension system for a vehicle having a set of handlebars and at least one pneumatic shock absorber, said air suspension system comprising a sealed chamber disposed in said handlebars and a fluid line interconnecting said chamber and said pneumatic shock absorber.

2. The air suspension system according to claim 1 further comprising a control valve in fluid communication with said chamber, said control valve disposed between said chamber and said pneumatic shock absorber, said fluid line interconnecting said chamber and said control valve and/or interconnecting said control valve and said pneumatic shock absorber.

3. The air suspension system according to claim 2 further comprising a control valve port in said handlebars in fluid communication with said chamber, said control valve connected to said control valve port.

4. The air suspension system according to claim 2 further comprising a pressure release valve in fluid communication with said chamber, said pressure release valve configured to selectively release air from said chamber.

5. The air suspension system according to claim 4 wherein said pressure release valve is connected to a bleeder valve port disposed in said handlebars and in communication with said chamber.

6. The air suspension system according to claim 4 wherein said pressure release valve is integral with said control valve.

7. The air suspension system according to claim 4 further comprising a separator and/or a check valve disposed between said pneumatic shock absorber and said chamber, said separator and/or said check valve configured to prevent oil from entering said chamber.

8. The air suspension system according to claim 7 wherein said separator and/or said check valve is integral with said control valve.

9. The air suspension system according to claim 7 wherein said separator and/or said check valve is disposed in said fluid line.

10. The air suspension system according to claim 1 further comprising a pressure release valve in fluid communication with said chamber, said pressure release valve configured to selectively release air from said chamber.

11. The air suspension system according to claim 1 further comprising a separator and/or a check valve disposed between said pneumatic shock absorber and said chamber, said separator and/or said check valve configured to prevent oil from entering said chamber.

12. The air suspension system according to claim 1 further comprising a handlebar cap or plug at an end of said handlebars, said handlebar cap or plug configured to form said sealed chamber inside said handlebars.

13. An air suspension system for a vehicle having a set of handlebars and at least one pneumatic shock absorber, said air suspension system comprising:
   a sealed chamber disposed in said handlebars;
   a control valve in fluid communication with said chamber, said control valve configured to selectively allow fluid to pass between said chamber and said pneumatic shock absorber; and
   a fluid line interconnecting said control valve and said pneumatic shock absorber and/or interconnecting said chamber and said control valve.

14. The air suspension system according to claim 13, wherein said control valve is attached to said handlebars at a control valve port disposed in said handlebars.

15. The air suspension system according to claim 13 further comprising a pressure release valve in fluid communication with said chamber, said pressure release valve configured to selectively release air from said chamber.

16. The air suspension system according to claim 15 further comprising a separator and/or a check valve disposed between said pneumatic shock absorber and said chamber, said separator and/or said check valve configured to prevent oil from entering said chamber.

17. The air suspension system according to claim 16 wherein said pressure release valve, said separator and/or said check valve is integral with said control valve.

18. The air suspension system according to claim 13 further comprising a separator and/or a check valve disposed between said pneumatic shock absorber and said chamber, said separator and/or said check valve configured to prevent oil from entering said chamber.

19. An air suspension system for a vehicle having a set of handlebars and at least one pneumatic shock absorber, said air suspension system comprising:
   a sealed chamber disposed in said handlebars;
   a control valve port in said handlebars, said control valve port in fluid communication with said chamber;
   a control valve connected to said control valve port and in fluid communication with said chamber, said control valve configured to selectively allow fluid to pass between said chamber and said pneumatic shock absorber;
   a fluid line interconnecting said control valve and said pneumatic shock absorber; and
   a pressure release valve in fluid communication with said chamber, said pressure release valve configured to selectively release air from said chamber.

20. The air suspension system according to claim 19 further comprising a separator and/or a check valve disposed between said pneumatic shock absorber and said chamber, said separator and/or said check valve configured to prevent oil from entering said chamber.

* * * * *